(12) United States Patent
Liu et al.

(10) Patent No.: US 12,192,074 B2
(45) Date of Patent: Jan. 7, 2025

(54) DATA COLLECTION METHOD AND APPARATUS, NETWORK DEVICE, AND STORAGE MEDIUM

(71) Applicants: China Mobile Communication Co., Ltd Research Institute, Beijing (CN); China Mobile Communications Group Co.,Ltd., Beijing (CN)

(72) Inventors: Le Liu, Beijing (CN); Aihua Li, Beijing (CN); Bin Wei, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 18/246,932

(22) PCT Filed: Sep. 28, 2021

(86) PCT No.: PCT/CN2021/121278
§ 371 (c)(1),
(2) Date: Mar. 28, 2023

(87) PCT Pub. No.: WO2022/068804
PCT Pub. Date: Apr. 7, 2022

(65) Prior Publication Data
US 2023/0370345 A1 Nov. 16, 2023

(30) Foreign Application Priority Data
Sep. 29, 2020 (CN) .......................... 202011057616.4

(51) Int. Cl.
*H04L 43/02* (2022.01)
*H04L 43/04* (2022.01)

(52) U.S. Cl.
CPC .............. *H04L 43/02* (2013.01); *H04L 43/04* (2013.01)

(58) Field of Classification Search
CPC . H04W 24/08; H04W 24/02; H04W 28/0247; H04L 41/5009; H04L 43/20; H04L 43/0876; H04L 43/08
See application file for complete search history.

(56) References Cited

U.S. PATENT DOCUMENTS 11,425,583 B2 * 8/2022 Lee ..................... H04L 65/1073
2020/0044943 A1 * 2/2020 Bor-Yaliniz ........ H04L 41/5009
(Continued)

FOREIGN PATENT DOCUMENTS

| CN | 102118836 A | 7/2011 |
|---|---|---|
| CN | 110677299 A | 1/2020 |

(Continued)

*Primary Examiner* — Chirag R Patel
(74) *Attorney, Agent, or Firm* — Price Heneveld LLP

(57) ABSTRACT

Provided are a data collection method and apparatus, network device, and storage medium. The method includes: receiving, by a first network data analytics function (NWDAF), a first message sent by a consumer, the first message is provided for requesting or subscribing to an NWDAF analytics service, wherein the first message includes a first parameter, the first parameter at least including at least one of: an event identifier (ID), a data collection time parameter, or area information; inquiring, by the first NWDAF through a first network device before starting data collection, whether an existing NWDAF is collecting or has already stored data matching the first parameter, and executing, by the first NWDAF, a corresponding data collection strategy according to an inquiry result.

17 Claims, 7 Drawing Sheets

(56) References Cited

U.S. PATENT DOCUMENTS

| | | |
|---|---|---|
| 2020/0045559 A1 | 2/2020 | Kim et al. |
| 2021/0367854 A1* | 11/2021 | Lee ................... H04L 41/5058 |
| 2021/0377754 A1* | 12/2021 | Marquezan ............. H04L 41/14 |
| 2021/0392540 A1 | 12/2021 | Chong et al. |
| 2022/0046101 A1 | 2/2022 | Zhang |
| 2022/0070071 A1* | 3/2022 | Poe ........................ H04L 41/14 |
| 2022/0103443 A1* | 3/2022 | Mary ...................... H04L 43/20 |
| 2022/0256396 A1* | 8/2022 | Hu ........................ H04W 76/30 |
| 2022/0337486 A1 | 10/2022 | Hong |
| 2023/0100296 A1* | 3/2023 | Chong ................. H04L 41/142 709/224 |

FOREIGN PATENT DOCUMENTS

| | | |
|---|---|---|
| CN | 110798360 A | 2/2020 |
| CN | 111614563 A | 9/2020 |
| KR | 20190132898 A | 11/2019 |
| WO | 2020169174 A1 | 8/2020 |

\* cited by examiner

DATA COLLECTION METHOD AND APPARATUS, NETWORK DEVICE, AND STORAGE MEDIUM

CROSS-REFERENCE TO RELATED APPLICATION

This application is the U.S. national phase of PCT Application No. PCT/CN2021/121278 filed on Sep. 28, 2021, which claims priority to Chinese Patent Application No. 202011057616.4, filed on Sep. 29, 2020 in China, the disclosures of which are incorporated in their entirety by reference herein.

TECHNICAL FIELD

The present disclosure relates to the field of core network technologies, in particular to a data collection method and apparatus, network device, and storage medium.

BACKGROUND

Currently, in the technical solution related to network data analytics function (NWDAF), certain network data analytics function (NWDAF) or entity with a data collection coordination and/or storage function has been introduced to decompose the NWDAF function and separate the data collection function from the analytics function, so as to enhance NWDAF data collection efficiency. However, such solution requires the addition of certain NWDAF or entity, which entails new services, service operations and new interfaces, thereby increasing network complexity. Moreover, the centralized data storage lowers the reliability of data disaster recovery; simultaneous data requests originated from multiple NWDAF instances will increase the signaling load on a node and affect its performance; furthermore, data and/or analysis results cannot be shared directly among NWDAFs.

Moreover, in the related solutions, data has to go through certain NWDAF or entity before being transferred to a corresponding NWDAF, which increases the steps of data collection, possibly leading to unnecessary delay and network load; and when the node is stateless, NWDAF may not be able to provide services to an NWDAF service consumer, which limits the capability of NWDAF.

SUMMARY

To solve the technical problem of the prior art, the present disclosure provides in some embodiments a data collection method and apparatus, network device and storage medium.

To achieve the foregoing objective, technical solutions of the embodiments of the present disclosure are implemented as follows.

In a first aspect, the present disclosure provides in an embodiment a data collection method, including:
receiving, by a first NWDAF, a first message sent by a consumer, the first message is provided for requesting or subscribing to an NWDAF analytics service, wherein the first message includes a first parameter, the first parameter at least including at least one of: an event identifier (ID), a data collection time parameter, or area information;
inquiring, by the first NWDAF through a first network device before starting data collection, whether an existing NWDAF is collecting or has already stored data matching the first parameter, and executing, by the first NWDAF, a corresponding data collection strategy according to an inquiry result.

In some optional embodiments of the present disclosure, the executing, by the first NWDAF, the corresponding data collection strategy according to the inquiry result includes:
discovering, by the first NWDAF, a data provider through a network repository function (NRF) in case that the first NWDAF does not discover, through the first network device, the existing NWDAF which is collecting or has already stored data matching the first parameter;
sending, by the first NWDAF, a second message to the data provider, the second message is provided for requesting or subscribing data, wherein the second message at least includes the first parameter;
receiving, by the first NWDAF, a success response message sent by the data provider and corresponding to the second message;
receiving, by the first NWDAF, data sent by the data provider and matching the first parameter.

In some optional embodiments of the present disclosure, the executing, by the first NWDAF, the corresponding data collection strategy according to the inquiry result includes:
sending, by the first NWDAF, a third message to a second NWDAF which is collecting data matching the first parameter in case that the first NWDAF discovers, through the first network device, the second NWDAF, the third message is provided for requesting or subscribing data matching the first parameter, wherein the third message at least includes the first parameter;
receiving, by the first NWDAF, a success response message sent by the second NWDAF and corresponding to the third message;
receiving, by the first NWDAF, data sent by the second NWDAF and matching the first parameter.

In some optional embodiments of the present disclosure, the executing, by the first NWDAF, the corresponding data collection strategy according to the inquiry result includes:
obtaining, by the first NWDAF through the first network device, information of a target NWDAF in case that the first NWDAF discovers, through the first network device, the existing NWDAF and a second network device which have already stored data matching the first parameter, the target NWDAF being the NWDAF or the second network device, wherein the target NWDAF is determined based on load states of the NWDAF and the second network device;
sending, by the first NWDAF, a fourth message to the target NWDAF, the fourth message is provided for requesting or subscribing data matching the first parameter, wherein the fourth message at least includes the first parameter;
receiving, by the first NWDAF, a success response message sent by the target NWDAF and corresponding to the fourth message;
judging, by the first NWDAF, whether the data stored by the target NWDAF satisfies the first parameter;
receiving, by the first NWDAF, data sent by the target NWDAF and matching the first parameter in case that the data stored by the target NWDAF satisfies the first parameter.

In some optional embodiments of the present disclosure, the method further includes:
discovering, by the first NWDAF, a data provider through an NRF in case that the data stored by the target NWDAF does not satisfy the first parameter;

sending, by the first NWDAF, a fifth message to the data provider, the fifth message is provided for requesting or subscribing first data which satisfies the first parameter and is not stored by the target NWDAF;

receiving, by the first NWDAF, a success response message sent by the data provider and corresponding to the fifth message;

receiving, by the first NWDAF, the first data sent by the data provider.

In some optional embodiments of the present disclosure, prior to the executing, by the first NWDAF, the corresponding data collection strategy according to the inquiry result, the method further includes:

sending, by the first NWDAF, a sixth message to the first network device, the sixth message is provided for registering or updating a profile of data, wherein the sixth message at least includes a first profile, the first profile at least including at least one of: an NWDAF identifier (ID), the first parameter, or a first data obtaining status.

In some optional embodiments of the present disclosure, the method further includes:

sending, by the first NWDAF, a seventh message to the first network device after the data collection is completed, the seventh message is provided for updating a profile of data, wherein the seventh message includes a second profile, the second profile at least including at least one of: an NWDAF ID, the first parameter, or a second data obtaining status.

In some optional embodiments of the present disclosure, the method further includes:

obtaining and feeding back, by the first NWDAF, a data analysis result to the service consumer;

sending, by the first NWDAF, an eighth message to the first network device, the eighth message is provided for registering or updating an analysis result, wherein the eighth message includes a third profile, the third profile at least including at least one of: NWDAF type information, a user equipment (UE) ID, an analytics ID, a network slice ID, or a serving area.

In some optional embodiments of the present disclosure, the method further includes:

discovering, by the first NWDAF, a second network device through an NRF;

sending, by the first NWDAF, a ninth message to the second network device, the ninth message is provided for requesting data aggregation, and receiving, by the first NWDAF, a success response message sent by the second network device and corresponding to the ninth message;

sending, by the first NWDAF, the data analysis result to the second network device.

In some optional embodiments of the present disclosure, the first NWDAF is a second network device.

The present disclosure further provides in an embodiment a data collection method, including:

receiving, by a second network device, a ninth message sent by a first NWDAF, the ninth message is provided for requesting data aggregation, wherein the ninth message at least includes related information of collected data and analysis report information;

judging, by the second network device based on the related information of data, whether there is matching data being transferred or has been stored, and/or, judging, by the second network device based on the analysis report information, there is matching data analysis result being transferred or has been stored;

sending, by the second network device, a response message corresponding to the ninth message to the first NWDAF in case that there is matching data being transferred or has been stored, and/or there is matching data analysis result being transferred or has been stored, wherein the response message is provided for informing the first NWDAF that the related information is being transferred or has been stored.

In some optional embodiments of the present disclosure, the method further includes:

sending, by the second network device, a success response message corresponding to the ninth message to the first NWDAF in case that there is no matching data being transferred or has been stored, and/or, there is no matching data analysis result being transferred or has been stored.

In some optional embodiments of the present disclosure, the method further includes:

sending, by the second network device, a tenth message to the first network device when starting aggregating data and/or data analysis results, the tenth message is provided for registering or updating a profile of data and/or analysis result;

sending, by the second network device, an eleventh message to the first network device when aggregation of data and/or data analysis results is completed, the eleventh message is provided for updating the profile of data and/or analysis result.

In a third aspect, the present disclosure further provides in an embodiment a data collection method, including:

receiving, by a second NWDAF which is collecting data, a third message sent by a first NWDAF, and sending, by the second NWDAF, a success response message corresponding to the third message to the first NWDAF, the third message is provided for requesting or subscribing data matching a first parameter, wherein the third message at least includes the first parameter, the first parameter at least including at least one of: an event ID, a data collection time parameter, or area information;

judging, by the second NWDAF, whether the data being collected satisfies the first parameter;

sending, by the second NWDAF, a twelfth message to a data provider in case that the data being collected does not satisfy the first parameter, and receiving, by the second NWDAF, a success response message sent by the data provider and corresponding to the twelfth message, the twelfth message is provided for modifying requesting or subscribing data.

In some optional embodiments of the present disclosure, the method further includes: sending, by the second NWDAF, a thirteenth message to a first network device, the thirteenth message is provided for updating a profile of data.

In a fourth aspect, the present disclosure further provides in an embodiment a data collection method, including:

receiving, by a first network device, a fourteenth message sent by an NWDAF, the fourteenth message is provided for registering or updating a profile of data, wherein the fourteenth message includes a fourth profile, the fourth profile at least including at least one of an NWDAF ID, a first parameter, or a data obtaining status, the first parameter at least including at least one of: an event ID, a data collection time parameter, or area information;

determining, by the first network device based on the data obtaining status, a data collection status of the NWDAF.

In some optional embodiments of the present disclosure, in case that the data obtaining status is a first data obtaining status, the data collection status of the NWDAF is a collecting status;

in case that the data obtaining status is a second data obtaining status, the data collection status of the NWDAF is a completed status.

In some optional embodiments of the present disclosure, the method further includes:

in case that the first network device determines that an existing NWDAF and a second network device have already stored data matching the first parameter, obtaining, by the first network device through an NRF, load states of the NWDAF and the second network device, and determining, by the first network device based on the load states of the NWDAF and the second network device, a target NWDAF.

In a fifth aspect, the present disclosure further provides in an embodiment a data collection apparatus, including: a first communication unit, an inquiry unit and an execution unit, wherein, the first communication unit is configured to receive a first message sent by a consumer, the first message is provided for requesting or subscribing to an NWDAF analytics service, wherein the first message includes a first parameter, the first parameter at least including at least one of: an event ID, a data collection time parameter, or area information;

the inquiry unit is configured to inquire, through a first network device before starting data collection, whether an existing NWDAF is collecting or has already stored data matching the first parameter; and the execution unit is configured to execute a corresponding data collection strategy according to an inquiry result obtained by the inquiry unit.

In some optional embodiments of the present disclosure, the execution unit is configured to:

discover a data provider through an NRF in case that the existing NWDAF which is collecting or has already stored data matching the first parameter is not discovered through the first network device;

send, through the first communication unit, a second message to the data provider, the second message is provided for requesting or subscribing data, wherein the second message at least includes the first parameter;

receive, through the first communication unit, a success response message sent by the data provider and corresponding to the second message;

receive, through the first communication unit, data sent by the data provider and matching the first parameter.

In some optional embodiments of the present disclosure, the execution unit is configured to:

send a third message to a second NWDAF which is collecting data matching the first parameter in case that the second NWDAF is discovered through the first network device, the third message is provided for requesting or subscribing data matching the first parameter, wherein the third message at least includes the first parameter;

receive, through the first communication unit, a success response message sent by the second NWDAF and corresponding to the third message;

receive, through the first communication unit, data sent by the second NWDAF and matching the first parameter.

In some optional embodiments of the present disclosure, the execution unit is configured to:

obtain, through the first network device, a target NWDAF in case that the existing NWDAF and a second network device which have already stored data matching the first parameter are discovered through the first network device, the target NWDAF being the NWDAF or the second network device, wherein the target NWDAF is determined based on load states of the NWDAF and the second network device;

send, through the first communication unit, a fourth message to the target NWDAF, the fourth message is provided for requesting or subscribing data matching the first parameter, wherein the fourth message at least includes the first parameter;

receive, through the first communication unit, a success response message sent by the target NWDAF and corresponding to the fourth message;

judge whether the data stored by the target NWDAF satisfies the first parameter;

receive, through the first communication unit, data sent by the target NWDAF and matching the first parameter in case that the data stored by the target NWDAF satisfies the first parameter.

In some optional embodiments of the present disclosure, the execution unit is further configured to:

discover a data provider through an NRF in case that the data stored by the target NWDAF does not satisfy the first parameter;

send, through the first communication unit, a fifth message to the data provider, the fifth message is provided for requesting or subscribing first data which satisfies the first parameter and is not stored by the target NWDAF;

receive, through the first communication unit, a success response message sent by the data provider and corresponding to the fifth message;

receive, through the first communication unit, the first data sent by the data provider.

In some optional embodiments of the present disclosure, the first communication unit is further configured to: before the execution unit executes the corresponding data collection strategy according to the inquiry result, send a sixth message to the first network device, the sixth message is provided for registering or updating a profile of data, wherein the sixth message at least includes a first profile, the first profile at least including at least one of: an NWDAF ID, the first parameter, or a first data obtaining status.

In some optional embodiments of the present disclosure, the first communication unit is further configured to: send a seventh message to the first network device after the data collection is completed, the seventh message is provided for updating a profile of data, wherein the seventh message includes a second profile, the second profile at least including at least one of: an NWDAF ID, the first parameter, or a second data obtaining status.

In some optional embodiments of the present disclosure, the execution unit is further configured to obtain a data analysis result;

the first communication unit is further configured to: feedback the data analysis result to the service consumer; and send an eighth message to the first network device, the eighth message is provided for registering or updating an analysis result, wherein the eighth message includes a third profile, the third profile at least including at least one of: NWDAF type information, a UE ID, an analytics ID, a network slice ID, or a serving area.

In some optional embodiments of the present disclosure, the execution unit is further configured to:
  discover a second network device through an NRF;
  send, through the first communication unit, a ninth message to the second network device, the ninth message is provided for requesting data aggregation, and receive, through the first communication unit, a success response message sent by the second network device and corresponding to the ninth message;
  send, through the first communication unit, the data analysis result to the second network device.

In some optional embodiments of the present disclosure, the first NWDAF is a second network device.

In a sixth aspect, the present disclosure further provides in an embodiment a data collection apparatus, including: a second communication unit and a first judgement unit, wherein,
  the second communication unit is configured to receive a ninth message sent by a first NWDAF, the ninth message is provided for requesting data aggregation, wherein the ninth message at least includes related information of collected data and analysis report information;
  the first judgement unit is configured to judge, based on the related information of data, whether there is matching data being transferred or has been stored, and/or, judge, based on the analysis report information, there is matching data analysis result being transferred or has been stored;
  the second communication unit is further configured to send a response message corresponding to the ninth message to the first NWDAF in case that the first judgement unit determines that there is matching data being transferred or has been stored, and/or there is matching data analysis result being transferred or has been stored, wherein the response message is provided for informing the first NWDAF that the related information is being transferred or has been stored.

In some optional embodiments of the present disclosure, the second communication unit is further configured to send a success response message corresponding to the ninth message to the first NWDAF in case that there is no matching data being transferred or has been stored, and/or, there is no matching data analysis result being transferred or has been stored.

In some optional embodiments of the present disclosure, the second communication unit is further configured to:
  send a tenth message to the first network device when starting aggregating data and/or data analysis results, the tenth message is provided for registering or updating a profile of data and/or analysis result;
  send an eleventh message to the first network device when aggregation of data and/or data analysis results is completed, the eleventh message is provided for updating the profile of data and/or analysis result.

In a seventh aspect, the present disclosure further provides in an embodiment a data collection apparatus, including: a third communication unit and a second judgement unit, wherein,
  the third communication unit is configured to receive, when being in a data collecting state, a third message sent by a first NWDAF, and send a success response message corresponding to the third message to the first NWDAF, the third message is provided for requesting or subscribing data matching a first parameter, wherein the third message at least includes the first parameter, the first parameter at least including at least one of: an event ID, a data collection time parameter, or area information;
  the second judgement unit is configured to judge whether the data being collected satisfies the first parameter;
  the third communication unit is configured to: send a twelfth message to a data provider in case that the data being collected does not satisfy the first parameter, and receive a success response message sent by the data provider and corresponding to the twelfth message, the twelfth message is provided for modifying requesting or subscribing data.

In some optional embodiments of the present disclosure, the third communication unit is further configured to send a thirteenth message to a first network device, the thirteenth message is provided for updating a profile of data.

In an eighth aspect, the present disclosure further provides in an embodiment a data collection apparatus, including: a fourth communication unit and a determination unit, wherein,
  the fourth communication unit is configured to receive a fourteenth message sent by an NWDAF, the fourteenth message is provided for registering or updating a profile of data, wherein the fourteenth message includes a fourth profile, the fourth profile at least including at least one of an NWDAF ID, a first parameter, or a data obtaining status, the first parameter at least including at least one of: an event ID, a data collection time parameter, or area information;
  the determination unit is configured to determine, based on the data obtaining status, a data collection status of the NWDAF.

In some optional embodiments of the present disclosure, in case that the data obtaining status is a first data obtaining status, the data collection status of the NWDAF is a collecting status;
  in case that the data obtaining status is a second data obtaining status, the data collection status of the NWDAF is a completed status.

In some optional embodiments of the present disclosure, the determination unit is further configured to:
  in case that an existing NWDAF and a second network device have already stored data matching the first parameter, obtain, through an NRF, load states of the NWDAF and the second network device; and
  determine, based on the load states of the NWDAF and the second network device, a target NWDAF.

In a ninth aspect, the present disclosure further provides in an embodiment a computer readable storage medium storing a computer program, wherein, the computer program is configured to be executed by a processor to implement steps of the data collection method in the aforementioned first aspect, second aspect, third aspect or fourth aspect.

In a tenth aspect, the present disclosure further provides in an embodiment a network device, including a memory, a processor and a computer program stored in the memory and executable by the processor, wherein, the processor is configured to execute the computer program to implement steps of the data collection method in the aforementioned first aspect, second aspect, third aspect or fourth aspect.

According to the data collection method and apparatus, network device and storage medium provided by the embodiments of the preset disclosure, in one aspect, after the first NWDAF receives from the consumer a message for requesting or subscribing to an NWDAF analytics service, the first NWDAF inquires through the first network device whether an existing NWDAF is collecting or has already stored data matching the first parameter, and executes a corresponding data collection strategy according to an inquiry result (e.g., there is no existing NWDAF collecting or has already stored data matching the first parameter discovered, there is an existing NWDAF which is collecting data, or there is an existing NWDAF which has already stored data); in another aspect, the profile of data of various NWDAFs are stored and updated through the first network device, thus the data collection coordination, historical data acquisition and data analysis result can be reused among multiple NWDAFs.

DETAILED DESCRIPTION

A more detailed description is provided hereinafter with reference to accompanying drawings and specific embodiments.

Figure 1:
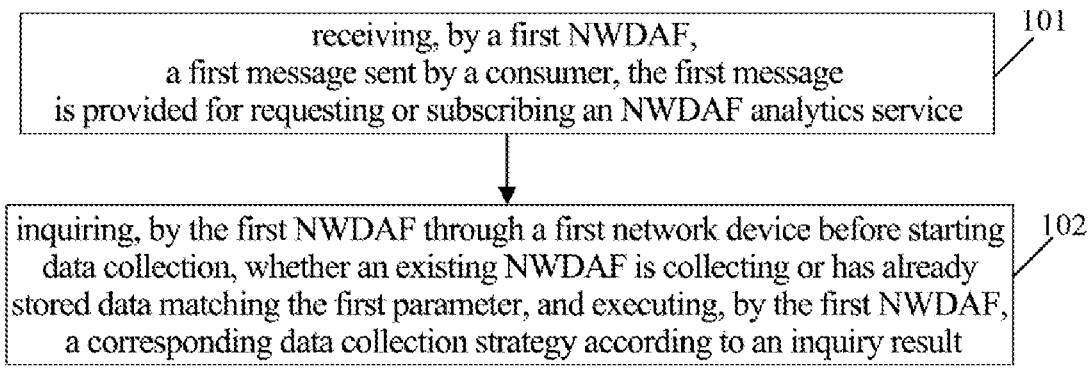
FIG. 1 is a flow diagram of a data collection method according to an embodiment of the present disclosure.

The present disclosure provides in some embodiments a data collection method. FIG. 1 is a flow diagram of a data collection method according to an embodiment of the present disclosure. As shown in FIG. 1, the method includes:

step 101: receiving, by a first NWDAF, a first message sent by a consumer, the first message is provided for requesting or subscribing to an NWDAF analytics service, wherein the first message includes a first parameter, the first parameter at least including at least one of: an event identifier (ID), a data collection time parameter, or area information;

step 102: inquiring, by the first NWDAF through a first network device before starting data collection, whether an existing NWDAF is collecting or has already stored data matching the first parameter, and executing, by the first NWDAF, a corresponding data collection strategy according to an inquiry result.

In this embodiment, the consumer is a node device in need of the NWDAF analytics service. Optionally, the consumer may be implemented by other network device. For example, the consumer may be a network function (NF) device, an application function (AF) device, or the like. Certainly, other node devices in need of the NWDAF analytics service also fall within the scope of this embodiment, and there is no further limitation in this embodiment.

In this embodiment, a data collection system architecture may include multiple NWDAFs. The multiple NWDAFs are divided into at least two categories: the first category is the first NWDAF, the second category is the NWDAF (the second NWDAF is those in the second category that satisfy the need of the consumer). The second NWDAF collects data from a data provider, and according to the need of the consumer, the first NWDAF collects data from the second NWDAF satisfying the need and analyzes the data. Optionally, the multiple NWDAFs further include a second network device. The second network device may be referred to as a central NWDAF or data repository. The second network device aggregates data and/or analysis results collected by various first NWDAFs. A detailed description thereof is provided in subsequent embodiments.

Optionally, the first NWDAF is the second network device. That is, the first NWDAF may serve as the second network device according to an operator's configuration.

In this embodiment, the first parameter at least includes at least one of: an event identifier (ID), a data collection time parameter, or area information. The event ID includes multiple event IDs which may be indicated in the form of an event ID list, an event ID set, an event ID group or the like. The data collection time parameter may be indicated in the form of a time period of data collection, a starting time and a completion time of data collection, a starting time or a completion time of data collection in conjunction with a data collection duration, or the like. The area information is a specific area, a designated area, a concerned area, an area of interest, or the like.

In this embodiment, the first NWDAF inquires, through the first network device, whether an NWDAF is collecting or has already stored data matching the first parameter, that is, the first NWDAF determines the data collection status of the second NWDAF, and executes a corresponding data collection strategy according to the data collection status of the second NWDAF.

As a first implementation, the executing the corresponding data collection strategy according to the inquiry result includes: the first NWDAF discovers a data provider through a network repository function (NRF) in case that the first NWDAF does not discover, through the first network device, the existing NWDAF which is collecting or has already stored data matching the first parameter; the first NWDAF sends a second message to the data provider, the second message is provided for requesting or subscribing data, wherein the second message at least includes the first parameter; the first NWDAF receives a success response message that is sent by the data provider and corresponds to the second message; the first NWDAF receives data that is sent by the data provider and matches the first parameter.

In this embodiment, in case that there is no NWDAF which is collecting or has already stored data matching the first parameter, the first NWDAF discovers, through the NRF, a data provider which provides data matching the first parameter, and obtains the data matching the first parameter from the data provider. The data provider may be a network device initially storing the data, a network device storing the data in advance, or the like.

As a second implementation, the executing the corresponding data collection strategy according to the inquiry result includes: the first NWDAF sends a third message to a second NWDAF which is collecting data matching the first parameter in case that the first NWDAF discovers, through the first network device, the second NWDAF, the third message is provided for requesting or subscribing data matching the first parameter, wherein the third message at least includes the first parameter; the first NWDAF receives a success response message that is sent by the second NWDAF and corresponds to the third message; the first NWDAF receives data that is sent by the second NWDAF and matches the first parameter.

In this embodiment, in case that there is the second NWDAF which is collecting data matching the first parameter, the first NWDAF may obtain, through the first network device, related information of the second NWDAF, and send the third message to the second NWDAF, so as to obtain the data matching the first parameter from the second NWDAF.

As a third implementation, the executing the corresponding data collection strategy according to the inquiry result includes: the first NWDAF obtains, through the first network device, information of a target NWDAF in case that the first NWDAF discovers, through the first network device, the NWDAF and a second network device which have already stored data matching the first parameter, the target NWDAF being the NWDAF or the second network device, wherein the target NWDAF is determined based on load states of the NWDAF and the second network device; the first NWDAF sends a fourth message to the target NWDAF, the fourth message is provided for requesting or subscribing data matching the first parameter, wherein the fourth message at least includes the first parameter; the first NWDAF receives a success response message that is sent by the target NWDAF and corresponds to the fourth message; the first NWDAF judges whether the data stored by the target NWDAF satisfies the first parameter; the first NWDAF receives data sent by the target NWDAF and matching the first parameter in case that the data stored by the target NWDAF satisfies the first parameter.

In this embodiment, in case that there are the NWDAF and the second network device which have already stored data matching the first parameter, the first network device may obtain, from the NRF, the load states of the NWDAF and the second network device, select, based on the load states of the NWDAF and the second network device, a NWDAF with the least load from among the NWDAF and the second network device as the target NWDAF, and send the information of the target NWDAF (e.g., an ID or address of the target NWDAF) to the first NWDAF. Further, the first NWDAF obtains the data matching the first parameter from the target NWDAF.

Optionally, the method further includes: the first NWDAF discovers a data provider through an NRF in case that the data stored by the target NWDAF does not satisfy the first parameter; the first NWDAF sends a fifth message to the data provider, the fifth message is provided for requesting or subscribing first data which satisfies the first parameter and is not stored by the target NWDAF; the first NWDAF receives a success response message sent by the data provider and corresponding to the fifth message; the first NWDAF receives the first data sent by the data provider.

In this embodiment, in case that there are the NWDAF and the second network device which have already stored data matching the first parameter, the data stored in the determined target NWDAF may be complete data needed by the consumer, or may be a portion of the complete data needed by the consumer, the latter is the case in which the data stored by the target NWDAF does not satisfy the first parameter. For example, a consumer needs 100 pieces of data, while a target NWDAF only stores 50 pieces of them. Under this circumstance, the first NWDAF discovers a data provider through an NRF, and obtains from the data provider the remaining 50 pieces of data absent in the target NWDAF.

In some optional embodiments of the present disclosure, prior to the executing, by the first NWDAF, the corresponding data collection strategy according to the inquiry result, the method further includes: sending, by the first NWDAF, a sixth message to the first network device, the sixth message is provided for registering or updating a profile of data, wherein the sixth message at least includes a first profile, the first profile at least including at least one of: an NWDAF identifier (ID), the first parameter, or a first data obtaining status. The first data obtaining status may indicate a collecting status. For example, the to-be-registered or updated profile of data may be referred to as a profile of collected data.

In this embodiment, the first network device may be a network device having a data collection coordination function (DCCF). Optionally, the first network device may be a separate NF device, or may be a device having the NWDAF function. The first network device is used for obtaining profiles related to data collection of various NWDAFs, and updating the profiles.

In some optional embodiments of the present disclosure, the method further includes: sending, by the first NWDAF, a seventh message to the first network device after the data collection is completed, the seventh message is provided for updating a profile of data, wherein the seventh message includes a second profile, the second profile at least including at least one of: an NWDAF ID, the first parameter, or a second data obtaining status. The second data obtaining status may indicate a completed status.

In some optional embodiments of the present disclosure, the method further includes: obtaining and feeding back, by the first NWDAF, a data analysis result to the service consumer; sending, by the first NWDAF, an eighth message to the first network device, the eighth message is provided for registering or updating an analysis result, wherein the eighth message includes a third profile, the third profile at least including at least one of: NWDAF type information, a user equipment (UE) ID, an analytics ID, a network slice ID, or a serving area. For example, the third profile may also be referred to as a profile of analysis results.

In this embodiment, the UE ID is an identifier uniquely identifying user equipment. For example, the UE ID may be a subscription permanent identifier (SUPI). The network slice ID may specifically be represented by single network slice selection assistance information (S-NSSAI).

In some optional embodiments of the present disclosure, the method further includes: discovering, by the first NWDAF, a second network device through an NRF; sending, by the first NWDAF, a ninth message to the second network device, the ninth message is provided for requesting data aggregation, and receiving, by the first NWDAF, a success response message that is sent by the second network device and corresponds to the ninth message; sending, by the first NWDAF, the data analysis result to the second network device.

Figure 2:
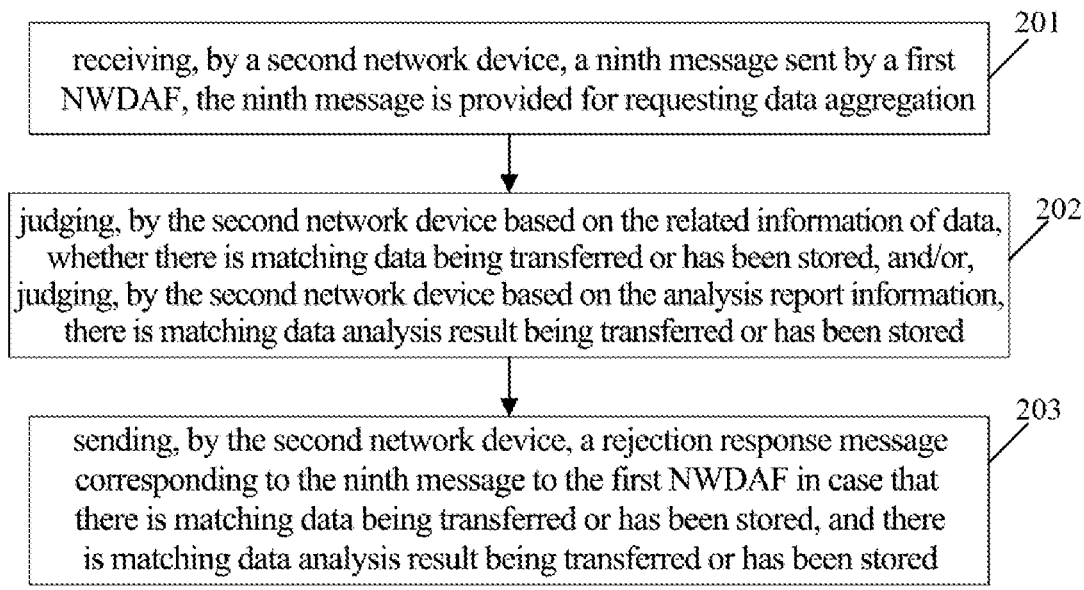
FIG. 2 is another flow diagram of a data collection method according to an embodiment of the present disclosure.

Based on the foregoing embodiments, the present disclosure further provides in some embodiments a data collection method. FIG. 2 is another flow diagram of a data collection method according to an embodiment of the present disclosure. As shown in FIG. 2, the method includes:

step 201: receiving, by a second network device, a ninth message sent by a first NWDAF, the ninth message is provided for requesting data aggregation, wherein the ninth message at least includes related information of collected data and analysis report information;

step 202: judging, by the second network device based on the related information of data, whether there is matching data being transferred or has been stored, and/or, judging, by the second network device based on the analysis report information, there is matching data analysis result being transferred or has been stored;

step 203: sending, by the second network device, a rejection response message corresponding to the ninth message to the first NWDAF in case that there is matching data being transferred or has been stored, and there is matching data analysis result being transferred or has been stored.

In some optional embodiments of the present disclosure, the method includes: sending, by the second network device, a success response message corresponding to the ninth message to the first NWDAF in case that there is no matching data being transferred or has been stored, and/or, there is no matching data analysis result being transferred or has been stored.

In this embodiment, the second network device may also be referred to as a central NWDAF or data repository.

In this embodiment, if the data for which the data aggregation is requested by the first NWDAF is being transferred or has been stored by the second network device, and the data analysis results for which the data aggregation is requested by the first NWDAF is being transferred or has been stored by the second network device, this means the second network device is collecting the to-be-aggregated related data, and there is no need to collecting data from the first NWDAF, thus, a rejection response message corresponding to the ninth message is fed back to the first NWDAF. It can be seen that, the rejection response message is used for informing the first NWDAF that the related data is being transferred or has been stored and there is no need for redundant aggregation. Correspondingly, if the data for which the data aggregation is requested by the first NWDAF is not being transferred or has not been stored by the second network device, and/or the data analysis results for which the data aggregation is requested by the first NWDAF is not being transferred or has not been stored by the second network device, this means the second network device does not collect the related data or data analysis results, then, a success response message corresponding to the ninth message is fed back to the first NWDAF. The first NWDAF sends to the second network device the data and/or data analysis results not stored in the second network device or not being collected by the second network device.

In some optional embodiments of the present disclosure, the method further includes: sending, by the second network device, a tenth message to the first network device when starting aggregating data and/or data analysis results, the tenth message is provided for registering or updating a profile of data and/or analysis result; sending, by the second network device, an eleventh message to the first network device when aggregation of data and/or data analysis results is completed, the eleventh message is provided for updating the profile of data and/or analysis result.

The profile included in the tenth message may at least include a time stamp for indicating when data aggregation starts; the profile included in the eleventh message may at least include a time stamp for indicating when data aggregation is completed.

Figure 3:
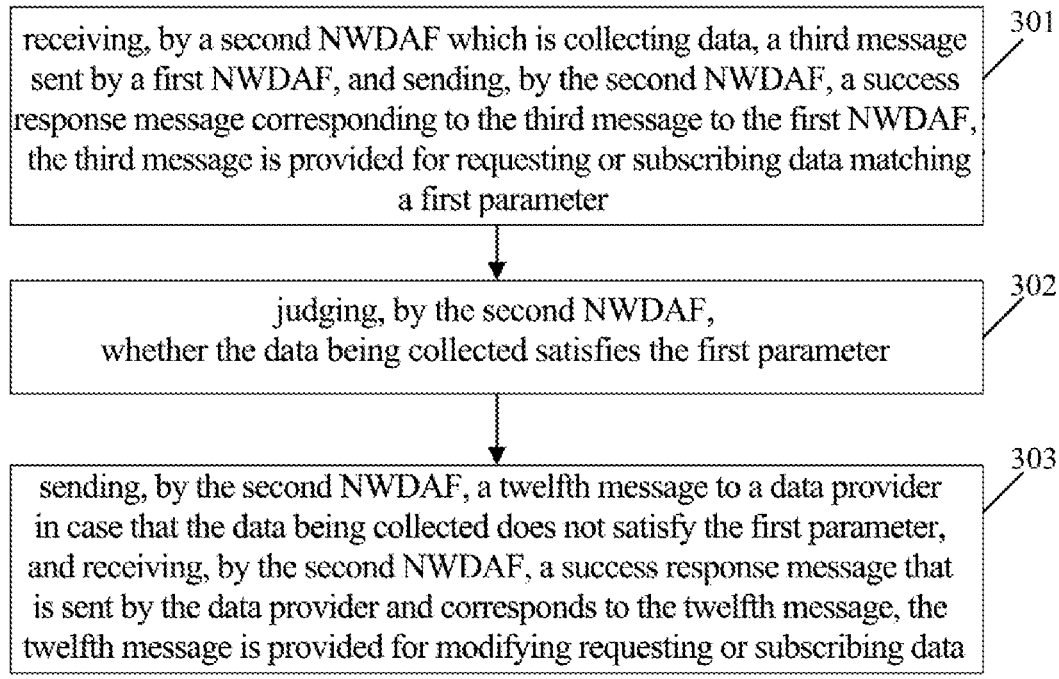
FIG. 3 is still another flow diagram of a data collection method according to an embodiment of the present disclosure.

Based on the foregoing embodiments, the present disclosure further provides in some embodiments a data collection method. FIG. 3 is still another flow diagram of a data collection method according to an embodiment of the present disclosure. As shown in FIG. 3, the method includes:

step 301: receiving, by a second NWDAF which is collecting data, a third message sent by a first NWDAF, and sending, by the second NWDAF, a success response message corresponding to the third message to the first NWDAF, the third message is provided for requesting or subscribing data matching a first parameter, wherein the third message at least includes the first parameter, the first parameter at least including at least one of: an event ID, a data collection time parameter, or area information;

step 302: judging, by the second NWDAF, whether the data being collected satisfies the first parameter;

step 303: sending, by the second NWDAF, a twelfth message to a data provider in case that the data being collected does not satisfy the first parameter, and receiving, by the second NWDAF, a success response message that is sent by the data provider and corresponds to the twelfth message, the twelfth message is provided for modifying requesting or subscribing data.

In this embodiment, the data being collected by the second NWDAF is data matching the first parameter in the consumer's request, but the data being collected by the second NWDAF is merely a portion of complete data needed by the consumer, rather than the complete data needed by the consumer. For example, a consumer needs 100 pieces of data, while the second NWDAF only stores 50 pieces of them. Thus, the second NWDAF needs to request the remaining 50 pieces of data from the data provider, to satisfy the requirement of the first parameter.

In some optional embodiments of the present disclosure, the method further includes: sending, by the second NWDAF, a thirteenth message to a first network device, the thirteenth message is provided for updating a profile of data.

Figure 4:
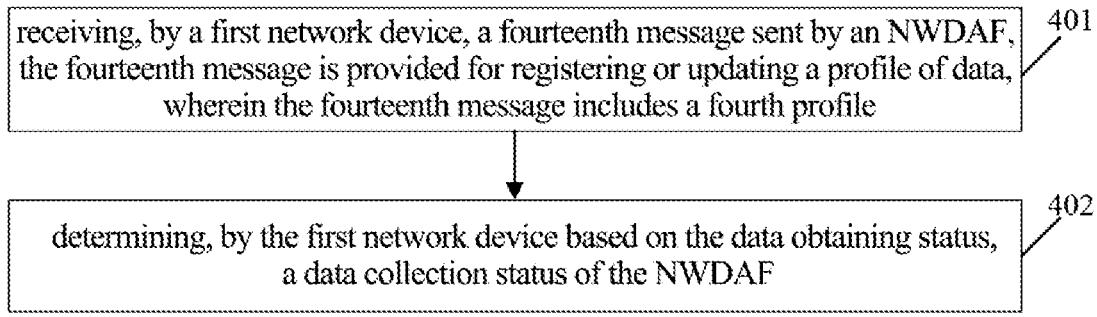
FIG. 4 is yet another flow diagram of a data collection method according to an embodiment of the present disclosure.

Based on the foregoing embodiments, the present disclosure further provides in some embodiments a data collection method. FIG. 4 is yet another flow diagram of a data collection method according to an embodiment of the present disclosure. As shown in FIG. 4, the method includes:

step 401: receiving, by a first network device, a fourteenth message sent by an NWDAF, the fourteenth message is provided for registering or updating a profile of data, wherein the fourteenth message includes a fourth profile, the fourth profile at least including at least one of an NWDAF ID, a first parameter, or a data obtaining status, the first parameter at least including at least one of: an event ID, a data collection time parameter, or area information;

step 402: determining, by the first network device based on the data obtaining status, a data collection status of the NWDAF.

In this embodiment, the first network device is a network device having a data collection coordination function (DCCF). Optionally, the first network device may be a separate NF device, or may be a device having the NWDAF function. The first network device is used for obtaining profiles related to data collection of various NWDAFs, and updating the profiles.

In this embodiment, before various NWDAFs collect data, the NWDAFs each send to the first network device a profile for registering or updating data, wherein the profile at least includes a collecting status (i.e., the first data obtaining status); when the data collection is completed, the NWDAFs each send to the first network device a profile for registering or updating, wherein the profile at least includes a completed status (i.e., the second data obtaining status). The first network device may determine, according to the data obtaining status in a profile, the data collection status of a corresponding NWDAF.

In some optional embodiments of the present disclosure, in case that the data obtaining status is the first data obtaining status, the data collection status of the NWDAF is a collecting status; in case that the data obtaining status is the second data obtaining status, the data collection status of the NWDAF is a completed status.

In this embodiment, that the fourth profile stored by the first network device includes the first data obtaining status represents that the corresponding NWDAF is collecting data, that is, the data collection status of the NWDAF is the collecting status; that the fourth profile includes the second data obtaining status represents that the corresponding NWDAF currently has completed corresponding data collection, and the data collection status of the NWDAF is the completed status. In other embodiments, if the first network device does not store the related fourth profile, this means that there is no NWDAF which has stored or being collecting related data.

In some optional embodiments, the method further includes: the first network device receives profiles of data and/or analysis result that are sent by various NWDAFs (e.g., including the aforementioned first NWDAF, second NWDAF, second network device), and updates the profiles.

In some optional embodiments of the present disclosure, the method further includes: in case that the first network device determines that an existing NWDAF and a second network device have already stored data matching the first parameter, obtaining, by the first network device through an NRF, load states of the NWDAF and the second network device, and determining, by the first network device based on the load states of the NWDAF and the second network device, a target NWDAF.

Figure 5:
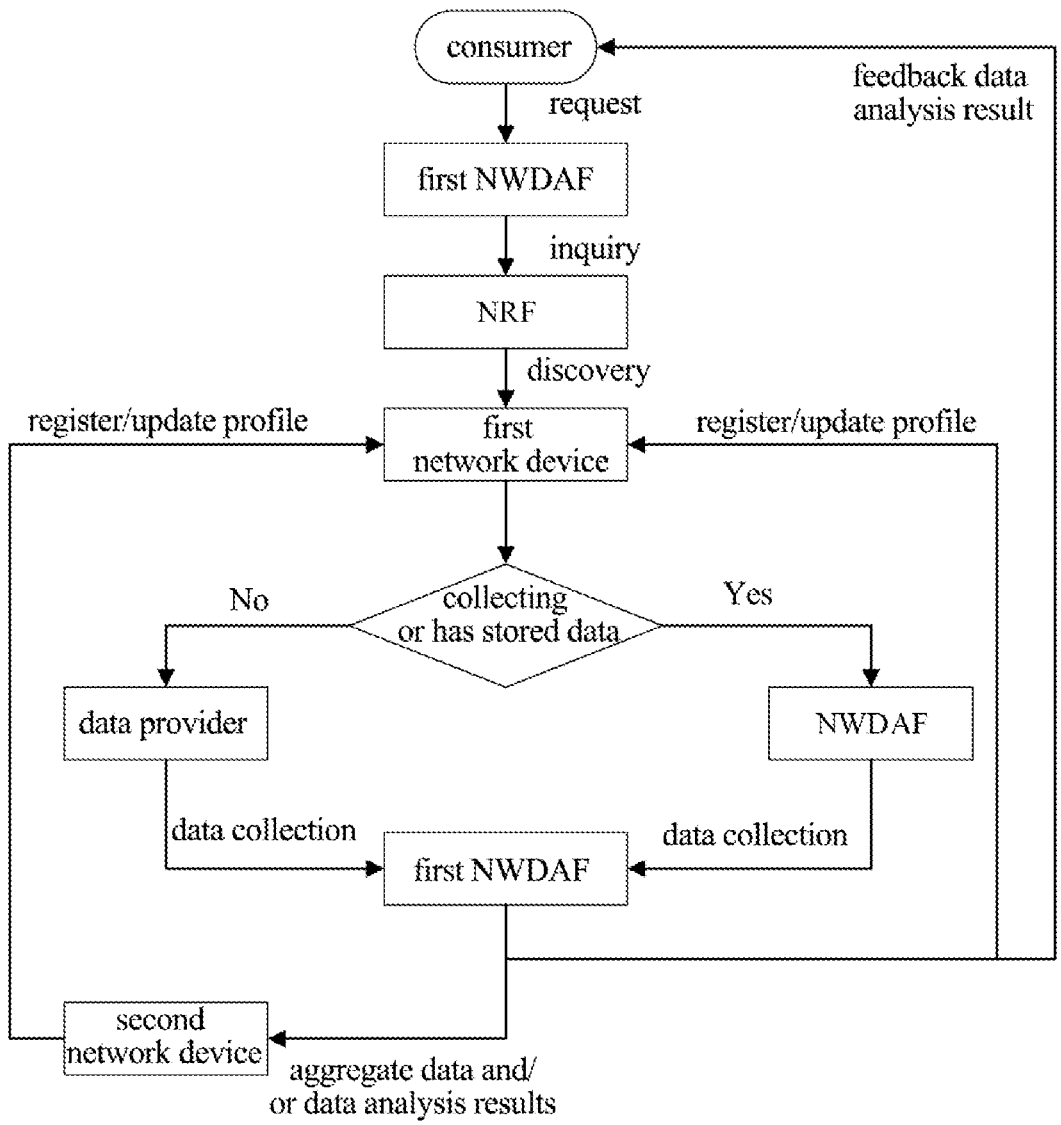
FIG. 5 is still yet another flow diagram of a data collection method according to an embodiment of the present disclosure.
Figure 6:
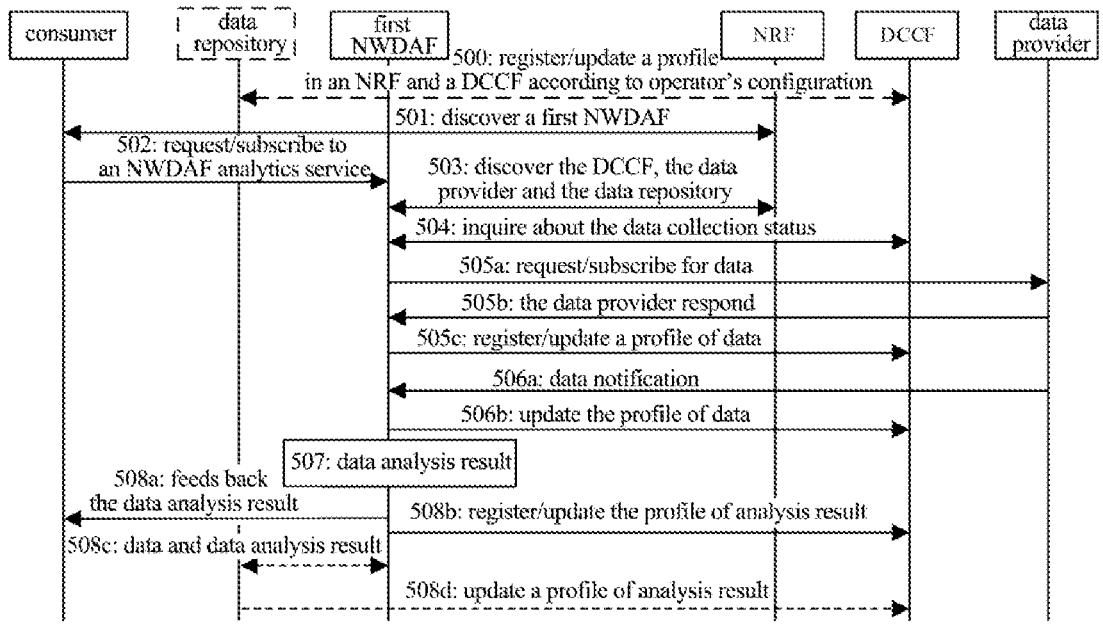
FIG. 6 is an interactive flow diagram of a data collection method according to an embodiment of the present disclosure.
Figure 7:
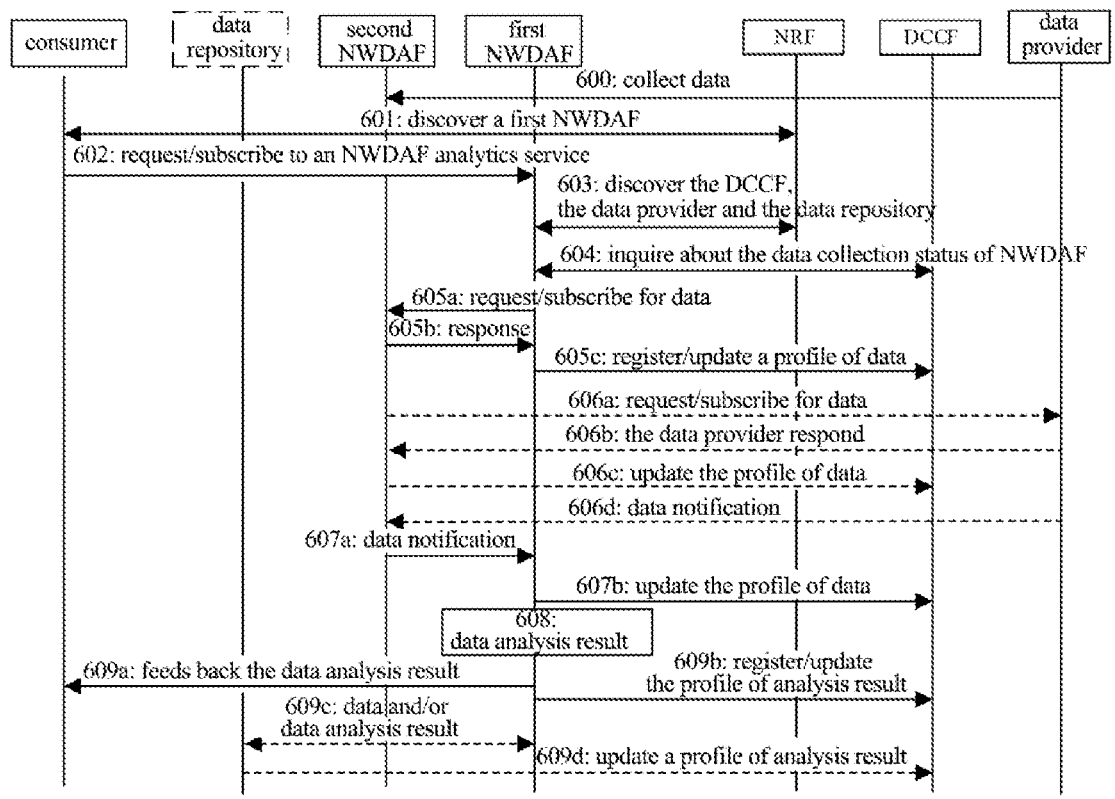
FIG. 7 is another interactive flow diagram of a data collection method according to an embodiment of the present disclosure.
Figure 8:
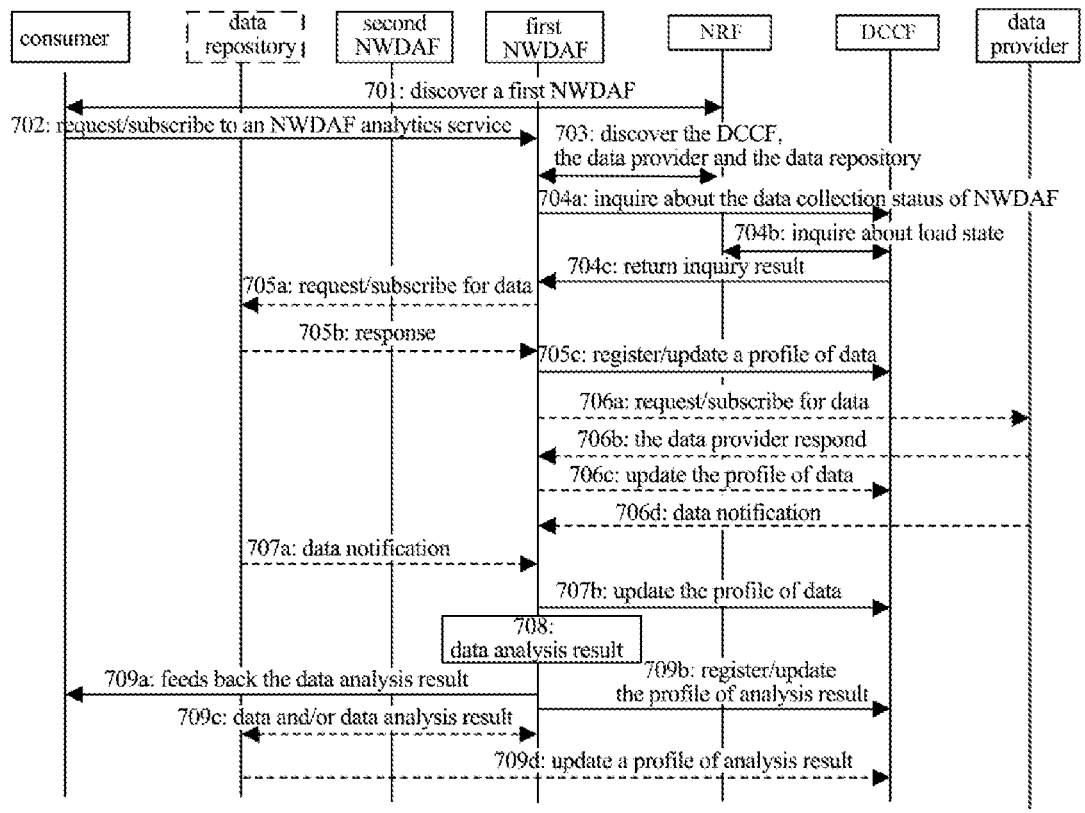
FIG. 8 is still another interactive flow diagram of a data collection method according to an embodiment of the present disclosure.

The process of the technical solution of this embodiment may be as shown in FIG. 5. The first NWDAF receives, from a consumer, a request for requesting or subscribing to an NWDAF analytics service. Before starting the data collection, the first NWDAF discovers a first network device through an NRF, and inquires through the first network device whether an NWDAF is collecting or has already stored data matching the first parameter. If an NWDAF is collecting or has already stored data matching the first parameter, the first NWDAF obtains an ID or address of the NWDAF, so as to collect related data from the NWDAF. If an NWDAF which is collecting or has already stored data matching the first parameter is not discovered, the first NWDAF interacts with a data provider directly to collect related data.

Additionally, after the first NWDAF receives a response indicating data subscription is successful, and before data collection starts, the first NWDAF registers/updates a profile of data in the first network device; after the data collection is completed, the first NWDAF registers/updates the profile of data in the first network device. After the first NWDAF obtains the data analysis result, on one hand, the first NWDAF feeds back the data analysis result to a consumer, on the other hand, the first NWDAF registers/updates the profile of data analysis result in the first network device.

The first NWDAF may transmit the collected data and analysis results to the second network device for aggregation of data and/or data analysis results. Before the aggregation or when the aggregation is completed, the second network device registers/updates the profile of data and/or the profile of analysis result in the first network device.

The first NWDAF may also serve as the second network device according to an operator's configuration.

The data collection scheme of the embodiments of the present disclosure is described in conjunction with specific scenarios hereinafter. In the description of following scenarios, it is assumed exemplarily that the first network device is a DCCH and the second network device is a data repository.

Scenario 1: a corresponding NWDAF which is collecting or has stored needed data is not discovered in a DCCF.

Step 500: a data repository registers/updates, according to an operator's configuration, a profile in an NRF and the DCCF. The data repository may serve as a data storage node or a data aggregation node.

In this example, the data repository is an optional node, that is, the system may not be provided with the data repository, which is not limiting in this embodiment.

Step 501: a consumer discovers a first NWDAF through the NRF.

In the embodiments of the present disclosure, the consumer may also be referred to as an NWDAF service consumer, or a service consumer, which is not limiting in the embodiments of the present disclosure.

Step 502: the consumer submits, to the first NWDAF, a request for or a subscription to an NWDAF analytics service. For example, the consumer may request or subscribe to the NWDAF analytics service through the first message in the aforementioned embodiments.

The first message may include a first parameter, and the first parameter at least includes at least one of: an event ID list, a time period of data collection, an area of interest, or the like.

Step 503: the first NWDAF discovers the DCCF, the data provider and the data repository through the NRF.

Here, the first NWDAF may discover the DCCF, the data provider and the data repository through a discovery mechanism. For example, the first NWDAF may send a discovery request to the NRF, wherein the discovery request may include the first parameter or some of the first parameter, to discover the suitable first NWDAF, data provider and data repository.

Step 504: the first NWDAF sends an inquiry message to the DCCF, to inquire about the data collection status of NWDAF, wherein the inquiry message includes the first parameter. If the DCCF fails to discover according to the first parameter the NWDAF which is collecting or has already stored data matching the first parameter, the DCCF responds to the first NWDAF with a message indicating that the inquiry has no result. The first NWDAF may further request/subscribe for the needed data according to the data provider discovered in the step 503.

Optionally, if there is the data repository, the first NWDAF may discover the data repository through the DCCF in this step.

Step 505a: the first NWDAF submits to the data provider a request or subscription for the needed data according to the first parameter.

For example, the first NWDAF submits to the data provider a request or subscription for the needed data through the second message in the aforementioned embodiments, wherein the second message at least includes the first parameter.

Step 505b: the data provider responds to the first NWDAF with an indication of request or subscription success.

Step 505c: before starting data collection, the first NWDAF registers/updates a profile of data in the DCCF.

For example, the first NWDAF may register or update a profile of data through the sixth message in the aforementioned embodiments, wherein the profile is the first profile in the aforementioned embodiments, and the first profile at least includes at least one of: an NWDAF ID, an event ID list, a time period of data collection, an area of interest, a data obtaining status (e.g., a collecting status), or the like.

Step 506a: the data provider sends data matching the first parameter to the first NWDAF.

Step 506b: after the data collection is completed, the first NWDAF updates the profile of data in the DCCF.

For example, the first NWDAF may update the profile of data through the seventh message in the aforementioned embodiments, wherein the profile is the second profile in the aforementioned embodiments, and the second profile at least includes at least one of: an NWDAF ID, an event ID list, a time period of data collection, an area of interest, or a data obtaining status (e.g., a completed status).

Step 507: the first NWDAF performs analysis according to the collected data, to obtain the data analysis result.

Step 508a: the first NWDAF feeds back to the consumer the data analysis result.

Step 508b: the first NWDAF registers/updates the profile of analysis result in the DCCF.

For example, the first NWDAF may register/update the analysis result through the eighth message in the aforementioned embodiments, wherein the profile is the third profile in the aforementioned embodiments, and the profile at least includes at least one of: an NWDAF type, an SUFI, an analytics ID, an S-NSSAI, a serving area, or the like.

Step 508c: optionally, if there is a data repository and the first NWDAF is not the data repository, the first NWDAF initiates an interaction request according to the data repository discovered in the step 504, and after the first NWDAF receives a success response from the data repository, the first NWDAF transmits the collected data and/or data analysis result to the data repository for aggregation.

For example, the interaction request is the ninth message in the aforementioned embodiments.

Step 508d: when starting data aggregation and/or data analysis result aggregation, the data repository registers/updates a profile of data and/or a profile of analysis result in the DCCF, and after completing the data aggregation and/or data analysis result aggregation, the data repository registers/updates the profile of data and/or the profile of analysis result in the DCCF again.

Optionally, if the NWDAF is combined with a 5G NF, the NWDAF directly collects data from the related 5GC NF, and should not send unnecessary inquiry requests to the DCCF. These collocated NWDAFs may register/update the profile in the DCCF in a data collection process.

Scenario 2: a corresponding NWDAF which is collecting needed data is discovered in a DCCF.

Step 600: the second NWDAF is collecting data from a data provider, for example, the second NWDAF is performing the step 506a in the scenario 1.

Step 601: the consumer discovers the first NWDAF through an NRF.

Step 602: the consumer submits, to the first NWDAF, a request for or a subscription to an NWDAF analytics service. For example, the consumer may request or subscribe to the NWDAF analytics service through the first message in the aforementioned embodiments.

The first message may include a first parameter, and the first parameter at least includes at least one of: an event ID list, a time period of data collection, an area of interest, or the like.

Step 603: the first NWDAF discovers the DCCF, the data provider and the data repository through the NRF.

Here, the first NWDAF may discover the DCCF, the data provider and the data repository through a discovery mechanism. For example, the first NWDAF may send a discovery request to the NRF, wherein the discovery request may include the first parameter or some of the first parameter, to discover the suitable first NWDAF, data provider and data repository.

Step 604: the first NWDAF sends an inquiry message to the DCCF, to inquire about the data collection status of NWDAF, wherein the inquiry message includes the first parameter. If the DCCF discovers, by analyzing the inputted parameter, the second NWDAF which is collecting data matching the first parameter, the DCCF sends the ID or address of the second NWDAF to the first NWDAF.

Optionally, if there is the data repository, the first NWDAF may discover the data repository through the DCCF in this step.

Step 605a: the first NWDAF submits to the second NWDAF which is collecting the needed data a request or subscription for the needed data.

For example, the first NWDAF submits to the second NWDAF a request or subscription for the needed data through the third message in the aforementioned embodiments, wherein the third message at least includes the first parameter.

Step 605b: the second NWDAF which is collecting the needed data responds to the first NWDAF with an indication of request or subscription success.

Step 605c: before starting data collection, the first NWDAF registers/updates a profile of data in the DCCF.

For example, the first NWDAF may register or update a profile of data through the sixth message in the aforementioned embodiments, wherein the profile is the first profile in the aforementioned embodiments, and the first profile at least includes at least one of: an NWDAF ID, an event ID list, a time period of data collection, an area of interest, a data obtaining status (e.g., a collecting status), or the like. If the second NWDAF which is collecting data completely satisfies the first parameter needed by the consumer, step 606a to step 606d are skipped, otherwise the process proceeds to the step 606a to step 606d.

Step 606a: the second NWDAF which is collecting data judges whether the collected data satisfies the first parameter; if the collected data does not satisfy the first parameter, the second NWDAF submits to the data provider a request or subscription for the needed data; the request message may include the first parameter, or related parameter of other data than the data being collected among the first parameter.

Step 606b: the data provider responds to the second NWDAF which is collecting data with an indication of request or subscription success.

Step 606c: the second NWDAF which is collecting data updates the profile of data in the DCCF.

For example, the second NWDAF which is collecting data updates the profile of data collection in the DCCF through the thirteenth message in the aforementioned embodiments.

Step 606d: the data provider informs the second NWDAF which is collecting data of the needed data.

Step 607a: the second NWDAF which is collecting data informs the first NWDAF of the needed data.

Step 607b: after the data collection is completed, the first NWDAF updates the profile of data in the DCCF.

For example, the first NWDAF may update the profile of data through the seventh message in the aforementioned embodiments, wherein the profile is the second profile in the aforementioned embodiments, and the second profile at least includes at least one of: an NWDAF ID, an event ID list, a time period of data collection, an area of interest, or a data obtaining status (e.g., a completed status).

Step 608: the first NWDAF performs analysis according to the collected data, to obtain the data analysis result.

Step 609a: the first NWDAF feeds back to the consumer the data analysis result.

Step 609b: the first NWDAF registers/updates the profile of analysis result in the DCCF.

For example, the first NWDAF may register/update the analysis result through the eighth message in the aforementioned embodiments, wherein the profile is the third profile in the aforementioned embodiments, and the profile at least includes at least one of: an NWDAF type, an SUFI, an analytics ID, an S-NSSAI, a serving area, or the like.

Step 609c: optionally, if there is a data repository and the first NWDAF is not the data repository, the first NWDAF initiates an interaction request according to the data repository discovered in the step 604, the data repository judges, upon receiving the interaction request, whether corresponding data and/or data analysis results are being transferred or have been stored, if there is redundant aggregation, the data repository sends a rejection response to the first NWDAF, and if there is no redundant aggregation, the data repository sends a success response to the first NWDAF; after the first NWDAF receives the success response from the data repository, the first NWDAF transmits the collected data and/or data analysis results to the data repository for aggregation.

For example, the interaction request is the ninth message in the aforementioned embodiments.

Step 609d: when starting data aggregation and/or data analysis result aggregation, the data repository registers/updates a profile of data and/or a profile of analysis result in the DCCF, and after completing the data aggregation and/or data analysis result aggregation, the data repository registers/updates the profile of data and/or the profile of analysis result in the DCCF again.

It is noted, in this scenario, if there is a data repository, then before the step 600, the data repository registers/updates the profile in the DCCF according to an operator's configuration. The data repository may serve as a data aggregation node.

Optionally, if the NWDAF is combined with a 5G NF, the NWDAF directly collects data from the related 5GC NF, and should not send unnecessary inquiry requests to the DCCF.

These collocated NWDAFs may register/update the profile in the DCCF in a data collection process.

Scenario 3: a corresponding NWDAF which has stored all or a portion of needed data is discovered in a DCCF.

Step 701: the consumer discovers the first NWDAF through an NRF.

Step 702: the consumer submits, to the first NWDAF, a request for or a subscription to an NWDAF analytics service. For example, the consumer may request or subscribe to the NWDAF analytics service through the first message in the aforementioned embodiments.

The first message may include a first parameter, and the first parameter at least includes at least one of: an event ID list, a time period of data collection, an area of interest, or the like.

Step 703: the first NWDAF discovers the DCCF, the data provider and the data repository through the NRF.

Here, the first NWDAF may discover the DCCF, the data provider and the data repository through a discovery mechanism. For example, the first NWDAF may send a discovery request to the NRF, wherein the discovery request may include the first parameter or some of the first parameter, to discover the suitable first NWDAF, data provider and data repository.

Step 704a: the first NWDAF sends an inquiry message to the DCCF, to inquire about the data collection status of NWDAF, wherein the inquiry message includes the first parameter. The DCCF discovers, by analyzing the inputted parameter, a corresponding NWDAF (the second NWDAF or data repository) which has stored all or a portion of needed data and/or data analysis results.

Step 704b: the DCCF inquires, through the NRF, about the load states of the second NWDAF and the data repository, and determines a target NWDAF according to the load states of the second NWDAF and the data repository.

For example, the DCCF may select an NWDAF with less load from among the second NWDAF and the data repository as the target NWDAF.

Step 704c: the DCCF responds to the first NWDAF with the inquiry result of the step 704b, that is, return the ID or address of the NWDAF with less load.

In the description of this example, it is assumed exemplarily that the data repository is the target NWDAF with less load.

Optionally, if there is the data repository, the first NWDAF may discover the data repository through the DCCF in the process of step 704.

Step 705a: the first NWDAF submits to the data repository which has stored the needed data a request or subscription for the needed data and/or analysis result.

For example, the first NWDAF submits to the data repository a request or subscription for the needed data through the fourth message in the aforementioned embodiments, wherein the fourth message at least includes the first parameter.

Step 705b: the data repository which has stored the needed data responds to the first NWDAF with an indication of subscription success.

Step 705c: before starting data collection, the first NWDAF registers/updates a profile of data in the DCCF.

For example, the first NWDAF may register or update a profile of data through the sixth message in the aforementioned embodiments, wherein the profile is the first profile in the aforementioned embodiments, and the first profile at least includes at least one of: an NWDAF ID, an event ID list, a time period of data collection, an area of interest, a data obtaining status (e.g., a collecting status), or the like. If the data repository completely satisfies the first parameter needed by the consumer, step 706a to step 706d are skipped, otherwise the process proceeds to the step 706a to step 706d.

Step 706a: the first NWDAF judges whether the data stored by the data repository satisfies the first parameter; if the data does not satisfy the first parameter, the first NWDAF submits to the data provider a request or subscription for the needed data that is not yet collected; the request message may include the first parameter, or related parameter of other data than the data already stored in the data repository among the first parameter.

Here, the first NWDAF may judge whether the data stored by the data repository satisfies the first parameter according to the profiles of the related data and/or analysis result stored in the DCCF.

Step 706b: the data provider responds to the first NWDAF with an indication of request or subscription success.

Step 706c: the first NWDAF updates the profile of data in the DCCF.

Step 706d: the data provider informs the first NWDAF of the needed data.

Step 707a: the data repository informs the first NWDAF of the needed data and/or data analysis result.

Optionally, this step may be performed concurrently with the steps of step 706.

Step 707b: after the data collection is completed, the first NWDAF updates the profile of data in the DCCF.

For example, the first NWDAF may update the profile of data through the seventh message in the aforementioned embodiments, wherein the profile is the second profile in the aforementioned embodiments, and the second profile at least includes at least one of: an NWDAF ID, an event ID list, a time period of data collection, an area of interest, or a data obtaining status (e.g., a completed status).

Step 708: the first NWDAF performs analysis according to the collected data, to obtain the data analysis result.

Step 709a: the first NWDAF feeds back to the consumer the data analysis result.

Step 709b: the first NWDAF registers/updates the profile of analysis result in the DCCF.

For example, the first NWDAF may register/update the analysis result through the eighth message in the aforementioned embodiments, wherein the profile is the third profile in the aforementioned embodiments, and the profile at least includes at least one of: an NWDAF type, an SUFI, an analytics ID, an S-NSSAI, a serving area, or the like.

Step 709c: optionally, if there is a data repository and the first NWDAF is not the data repository, and the first NWDAF has performed the step 706 to collect data from the data provider, then the first NWDAF initiates an interaction request to the data repository, the data repository judges, upon receiving the interaction request, whether corresponding data and/or data analysis results are being transferred or have been stored, if there is redundant aggregation, the data repository sends a rejection response to the first NWDAF, and if there is no redundant aggregation, the data repository sends a success response to the first NWDAF; after the first NWDAF receives the success response from the data repository, the first NWDAF transmits the data and/or data analysis results to the data repository for aggregation.

For example, the interaction request is the ninth message in the aforementioned embodiments.

Step 709d: when starting data aggregation and/or data analysis result aggregation, the data repository registers/updates a profile of data and/or a profile of analysis result in the DCCF, and after completing the data aggregation and/or data analysis result aggregation, the data repository registers/updates the profile of data and/or the profile of analysis result in the DCCF again.

It is noted, in this scenario, if there is a data repository, then before the step 701, the data repository registers/updates the profile in the DCCF according to an operator's configuration. The data repository may serve as a data aggregation node.

Optionally, if the NWDAF is combined with a 5G NF, the NWDAF directly collects data from the related 5GC NF, and should not send unnecessary inquiry requests to the DCCF. These collocated NWDAFs may register/update the profile in the DCCF in a data collection process.

Figure 9:
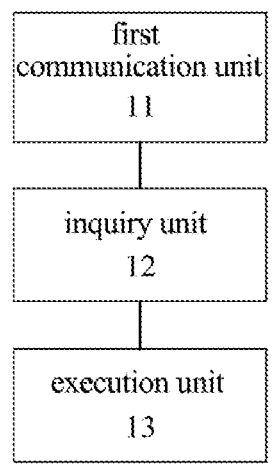
FIG. 9 is a schematic structural diagram of a data collection apparatus according to an embodiment of the present disclosure.

The present disclosure further provides in some embodiments a data collection apparatus, which is applied to the first NWDAF in the aforementioned embodiments. FIG. 9 is a schematic structural diagram of a data collection apparatus according to an embodiment of the present disclosure. As shown in FIG. 9, the apparatus includes: a first communication unit 11, an inquiry unit 12 and an execution unit 13, wherein, the first communication unit 11 is configured to receive a first message sent by a consumer, the first message is provided for requesting or subscribing to an NWDAF analytics service, wherein the first message includes a first parameter, the first parameter at least including at least one of: an event ID, a data collection time parameter, or area information;

the inquiry unit 12 is configured to inquire, through a first network device before starting data collection, whether an existing NWDAF is collecting or has already stored data matching the first parameter; and the execution unit 13 is configured to execute a corresponding data collection strategy according to an inquiry result obtained by the inquiry unit 12.

In some optional embodiments of the present disclosure, the execution unit 13 is configured to: discover a data provider through an NRF in case that the existing NWDAF which is collecting or has already stored data matching the first parameter is not discovered through the first network device; send, through the first communication unit 11, a second message to the data provider, the second message is provided for requesting or subscribing data, wherein the second message at least includes the first parameter; receive, through the first communication unit 11, a success response message sent by the data provider and corresponding to the second message; receive, through the first communication unit 11, data sent by the data provider and matching the first parameter.

In some optional embodiments of the present disclosure, the execution unit 13 is configured to: send a third message to a second NWDAF which is collecting data matching the first parameter in case that the second NWDAF is discovered through the first network device, the third message is provided for requesting or subscribing data matching the first parameter, wherein the third message at least includes the first parameter; receive, through the first communication unit, a success response message sent by the second NWDAF and corresponding to the third message; receive, through the first communication unit, data sent by the second NWDAF and matching the first parameter.

In some optional embodiments of the present disclosure, the execution unit 13 is configured to: obtain, through the first network device, a target NWDAF in case that the existing NWDAF and a second network device which have already stored data matching the first parameter are discovered through the first network device, the target NWDAF being the NWDAF or the second network device, wherein the target NWDAF is determined based on load states of the NWDAF and the second network device; send, through the first communication unit 11, a fourth message to the target NWDAF, the fourth message is provided for requesting or subscribing data matching the first parameter, wherein the fourth message at least includes the first parameter; receive, through the first communication unit 11, a success response message sent by the target NWDAF and corresponding to the fourth message; judge whether the data stored by the target NWDAF satisfies the first parameter; receive, through the first communication unit 11, data sent by the target NWDAF and matching the first parameter in case that the data stored by the target NWDAF satisfies the first parameter.

In some optional embodiments of the present disclosure, the execution unit 13 is further configured to: discover a data provider through an NRF in case that the data stored by the target NWDAF does not satisfy the first parameter; send, through the first communication unit 11, a fifth message to the data provider, the fifth message is provided for requesting or subscribing first data which satisfies the first parameter and is not stored by the target NWDAF; receive, through the first communication unit 11, a success response message sent by the data provider and corresponding to the fifth message; receive, through the first communication unit 11, the first data sent by the data provider.

In some optional embodiments of the present disclosure, the first communication unit 11 is further configured to: before the execution unit 13 executes the corresponding data collection strategy according to the inquiry result, send a sixth message to the first network device, the sixth message is provided for registering or updating a profile of data, wherein the sixth message at least includes a first profile, the first profile at least including at least one of: an NWDAF ID, the first parameter, or a first data obtaining status.

In some optional embodiments of the present disclosure, the first communication unit 11 is further configured to: send a seventh message to the first network device after the data collection is completed, the seventh message is provided for updating a profile of data, wherein the seventh message includes a second profile, the second profile at least including at least one of: an NWDAF ID, the first parameter, or a second data obtaining status.

In some optional embodiments of the present disclosure, the execution unit 13 is further configured to obtain a data analysis result;
the first communication unit 11 is further configured to:
feedback the data analysis result to the service consumer; and send an eighth message to the first network device, the eighth message is provided for registering or updating an analysis result, wherein the eighth message includes a third profile, the third profile at least including at least one of: NWDAF type information, a UE ID, an analytics ID, a network slice ID, or a serving area.

In some optional embodiments of the present disclosure, the execution unit 13 is further configured to: discover a second network device through an NRF; send, through the first communication unit 11, a ninth message to the second network device, the ninth message is provided for requesting data aggregation, and receive, through the first communication unit 11, a success response message sent by the second network device and corresponding to the ninth message; send, through the first communication unit 11, the data analysis result to the second network device.

In some optional embodiments of the present disclosure, the first NWDAF is a second network device.

In the embodiments of the present disclosure, both the inquiry unit 12 and the execution unit 13 in the data collection apparatus can be implemented by a central processing unit (CPU), digital signal processor (DSP), microcontroller unit (MCU) or field-programmable gate array (FPGA) in practical applications; the first communication unit 11 in the data collection apparatus can be implemented by a communication module (including: a basic communication kit, an operation system, communication module, standardized interfaces and protocols, etc.) and a transceiver antenna in practical applications.

Figure 10:
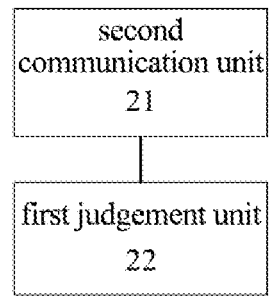
FIG. 10 is another schematic structural diagram of a data collection apparatus according to an embodiment of the present disclosure.

The present disclosure further provides in some embodiments a data collection apparatus, which is applied to the second network device in the aforementioned embodiments. FIG. 10 is another schematic structural diagram of a data collection apparatus according to an embodiment of the present disclosure. As shown in FIG. 10, the apparatus includes: a second communication unit 21 and a first judgement unit 22, wherein,
the second communication unit 21 is configured to receive a ninth message sent by a first NWDAF, the ninth message is provided for requesting data aggregation, wherein the ninth message at least includes related information of collected data and analysis report information;
the first judgement unit 22 is configured to judge, based on the related information of data, whether there is matching data being transferred or has been stored, and/or, judge, based on the analysis report information, there is matching data analysis result being transferred or has been stored;
the second communication unit 21 is further configured to send a rejection response message corresponding to the ninth message to the first NWDAF in case that the first judgement unit 22 determines that there is matching data being transferred or has been stored, and there is matching data analysis result being transferred or has been stored.

In some optional embodiments of the present disclosure, the second communication unit 21 is further configured to send a success response message corresponding to the ninth message to the first NWDAF in case that there is no matching data being transferred or has been stored, and/or, there is no matching data analysis result being transferred or has been stored.

In some optional embodiments of the present disclosure, the second communication unit 21 is further configured to: send a tenth message to the first network device when starting aggregating data and/or data analysis results, the tenth message is provided for registering or updating a profile of data and/or analysis result; send an eleventh message to the first network device when aggregation of data and/or data analysis results is completed, the eleventh message is provided for updating the profile of data and/or analysis result.

In the embodiments of the present disclosure, the first judgement unit 22 in the data collection apparatus can be implemented by a CPU, DSP, MCU or FPGA in practical applications; the second communication unit 21 in the data collection apparatus can be implemented by a communication module (including: a basic communication kit, an operation system, communication module, standardized interfaces and protocols, etc.) and a transceiver antenna in practical applications.

Figure 11:
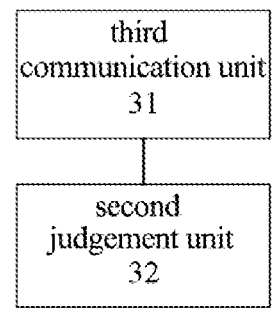
FIG. 11 is still another schematic structural diagram of a data collection apparatus according to an embodiment of the present disclosure.

The present disclosure further provides in some embodiments a data collection apparatus, which is applied to the second NWDAF in the aforementioned embodiments. FIG. 11 is still another schematic structural diagram of a data collection apparatus according to an embodiment of the present disclosure. As shown in FIG. 11, the apparatus includes: a third communication unit 31 and a second judgement unit 32, wherein,

- the third communication unit 31 is configured to receive, when being in a data collecting state, a third message sent by a first NWDAF, and send a success response message corresponding to the third message to the first NWDAF, the third message is provided for requesting or subscribing data matching a first parameter, wherein the third message at least includes the first parameter, the first parameter at least including at least one of: an event ID, a data collection time parameter, or area information;
- the second judgement unit 32 is configured to judge whether the data being collected satisfies the first parameter;
- the third communication unit 31 is configured to: send a twelfth message to a data provider in case that the data being collected does not satisfy the first parameter, and receive a success response message sent by the data provider and corresponding to the twelfth message, the twelfth message is provided for modifying requesting or subscribing data.

In some optional embodiments of the present disclosure, the third communication unit 31 is further configured to send a thirteenth message to a first network device, the thirteenth message is provided for updating a profile of data.

In the embodiments of the present disclosure, the second judgement unit 32 in the data collection apparatus can be implemented by a CPU, DSP, MCU or FPGA in practical applications; the third communication unit 31 in the data collection apparatus can be implemented by a communication module (including: a basic communication kit, an operation system, communication module, standardized interfaces and protocols, etc.) and a transceiver antenna in practical applications.

Figure 12:
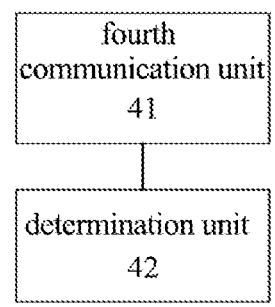
FIG. 12 is yet another schematic structural diagram of a data collection apparatus according to an embodiment of the present disclosure.

The present disclosure further provides in some embodiments a data collection apparatus, which is applied to the first network device in the aforementioned embodiments. FIG. 12 is yet another schematic structural diagram of a data collection apparatus according to an embodiment of the present disclosure. As shown in FIG. 12, the apparatus includes: a fourth communication unit 41 and a determination unit 42, wherein,

- the fourth communication unit 41 is configured to receive a fourteenth message sent by an NWDAF, the fourteenth message is provided for registering or updating a profile of data, wherein the fourteenth message includes a fourth profile, the fourth profile at least including at least one of an NWDAF ID, a first parameter, or a data obtaining status, the first parameter at least including at least one of: an event ID, a data collection time parameter, or area information;
- the determination unit 42 is configured to determine, based on the data obtaining status, a data collection status of the NWDAF.

In some optional embodiments of the present disclosure, in case that the data obtaining status is a first data obtaining status, the data collection status of the NWDAF is a collecting status; in case that the data obtaining status is a second data obtaining status, the data collection status of the NWDAF is a completed status.

In some optional embodiments of the present disclosure, the determination unit 42 is further configured to: in case that an existing NWDAF and a second network device have already stored data matching the first parameter, obtain, through an NRF, load states of the NWDAF and the second network device; and determine, based on the load states of the NWDAF and the second network device, a target NWDAF.

In the embodiments of the present disclosure, the determination unit 42 in the data collection apparatus can be implemented by a CPU, DSP, MCU or FPGA in practical applications; the fourth communication unit 41 in the data collection apparatus can be implemented by a communication module (including: a basic communication kit, an operation system, communication module, standardized interfaces and protocols, etc.) and a transceiver antenna in practical applications.

It is noted, the data collection apparatus according to the aforementioned embodiments and the data collection apparatus process implemented by the apparatus is illustrated exemplarily in terms of the division of various program modules. In practical applications, the process may be reassigned to different program modules as necessary, that is, the internal structure of the apparatus may be divided into different program modules to implement all of or a part of the aforementioned process. In addition, the data collection apparatus and the data collection method according to the embodiments are of the same inventive concept. For detailed description of the specific implementations of the apparatus, a reference may be made to the method embodiments, a repeated detailed description is omitted herein.

Figure 13:
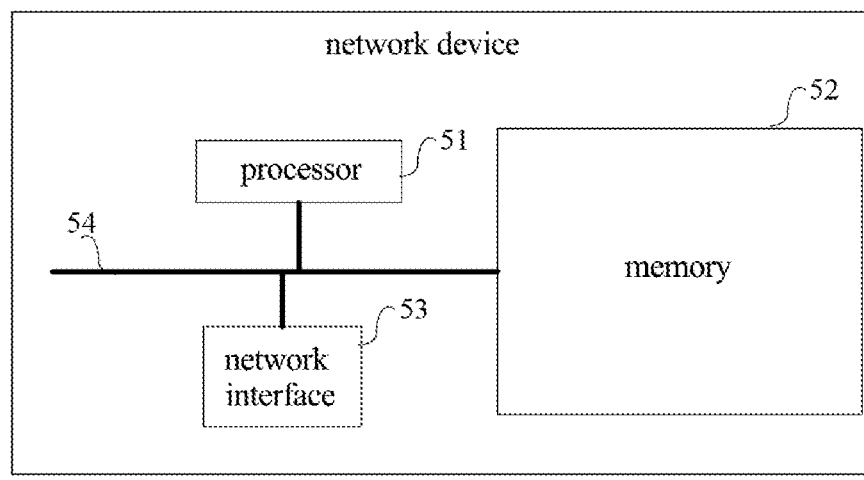
FIG. 13 is a hardware structure diagram of a network device according to an embodiment of the present disclosure.

The present disclosure further provides in some embodiments a network device, which is specifically the first NWDAF, the second network device, the second NWDAF or the first network device in the aforementioned embodiments. FIG. 13 is a hardware structure diagram of a network device according to an embodiment of the present disclosure. As shown in FIG. 13, the network device includes: a memory 52, a processor 51 and a computer program stored in the memory 52 and executable by the processor 51, wherein, the processor 51 is configured to execute the computer program to implement steps of the data collection method applied to the first NWDAF, the second network device, the second NWDAF or the first network device according to the embodiments.

Optionally, the network device further includes one or more network interfaces 53. Various components in the network device are coupled to each other through a bus system 54. It may be understood that the bus system 54 is configured to implement connection and communication among these components. The bus system 54 further includes a power bus, a control bus, and a status signal bus in addition to a data bus. However, for clarity of description, various buses in FIG. 13 are all labeled as the bus system 54.

It may be understood that the memory 52 may be a volatile memory or a nonvolatile memory, or may include both a volatile memory and a nonvolatile memory. The nonvolatile memory may be a read-only memory (ROM), a programmable ROM (PROM), an erasable programmable PROM (EPROM), an electrically EPROM (EEPROM), a ferromagnetic random access memory (FRAM), a flash memory, a magnetic surface storage, an optic disc or a compact disc read-only memory (CD-ROM). The magnetic surface storage may be a magnetic disk storage or a magnetic tape storage. The volatile memory may be a random access memory (RAM), which is used as an external cache. By way of example rather than limitation, many forms of RAMs such as a static RAM (SRAM), a synchronous SRAM (SSRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct Rambus RAM (DRRAM) may be used. The memory 52 described in embodiments of the present disclosure is intended to include, but is not limited to, these and any other appropriate types of memories.

The foregoing method disclosed in the embodiments of the present disclosure may be applied to the processor 51 or implemented by the processor 51. The processor 51 may be an integrated circuit chip having a signal processing capability. During implementation, the steps in the foregoing method may be accomplished by hardware integrated logic circuits or instructions in a software form in the processor 51. The processor 51 may be a general-purpose processor, a digital signal processor (DSP), or other programmable logic device, discrete gate or transistor logic device, a discrete hardware component. The processor 51 can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may reside in a storage medium located in the memory 52. The processor 51 reads information from the memory 52 and accomplishes the steps in the foregoing method using hardware of the processor 51.

In exemplary embodiments, the network device may be implemented in one or more application specific integrated circuits (ASICs), a DSP, a programmable logic device (PLD), a complex programmable logic device (CPLD), an FPGA, a general-purpose processor, a controller, an MCU, a microprocessor, other electronic unit, to perform the aforementioned methods.

In exemplary embodiments, the present disclosure further provides in an embodiment a computer readable storage medium, e.g., the memory 52 including a computer program, wherein the computer program may be executed by the processor 51 of the network device to implement steps of the aforementioned methods. The computer readable storage medium may be an FRAM, an ROM, a PROM, an EPROM, an EEPROM, a flash memory, a magnetic surface storage, an optic disc, or a CD-ROM, or may be various devices including one of or a combination of foregoing memories.

The computer readable storage medium according to the embodiment of the present disclosure stores a computer program. The program, when being executed by a processor, implements steps of the data collection method applied to the first NWDAF, the second network device, the second NWDAF or the first network device according to the embodiments.

The methods disclosed in the method embodiments of the present disclosure may be combined arbitrarily without conflict to obtain new method embodiments.

The features disclosed in the product embodiments of the present disclosure may be combined arbitrarily without conflict to obtain new product embodiments.

The features disclosed in the method or device embodiments of the present disclosure may be combined arbitrarily without conflict to obtain new method embodiments or device embodiments.

In the several embodiments provided in this disclosure, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or in the form of hardware plus software function unit.

It is appreciated by those of ordinary skill in the art that, all or a part of the steps of the method embodiments may be implemented by hardware related to program instructions. The program may be stored in a computer readable storage medium. When the program is executed, the steps of the method embodiments may be implemented. The storage medium includes various media capable of storing program codes, such as a removable storage device, an ROM, an RAM, a magnetic disk or an optic disc.

If the integrated unit is implemented in a form of a software functional unit and sold or used as an independent product, the integrated unit may be stored in a computer-readable storage medium. Based on such an understanding, essential parts, or parts contributing to the related art, of the technical solution of the present disclosure may be implemented in form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a removable storage device, an ROM, an RAM, a magnetic disk, or an optical disc.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A data collection method, comprising:
 receiving, by a first network data analytics function (NWDAF), a first message sent by a consumer, wherein the first message is provided for requesting or subscribing to an NWDAF analytics service, the first message comprises a first parameter, the first parameter comprises at least one of: an event identifier (ID), a data collection time parameter, or area information;

inquiring, by the first NWDAF through a first network device before starting data collection, whether an existing NWDAF is collecting or has already stored data matching the first parameter, and executing, by the first NWDAF, a corresponding data collection strategy according to an inquiry result;

wherein the executing, by the first NWDAF, the corresponding data collection strategy according to the inquiry result comprises:

discovering a data provider through a network repository function (NRF) in case that the first NWDAF does not discover through the first network device, an existing NWDAF which is collecting or has already stored data matching the first parameter;

sending, by the first NWDAF, a second message to the data provider, the second message is provided for requesting or subscribing data, wherein the second message comprises at least the first parameter;

receiving, by the first NWDAF, a success response message which is sent by the data provider and corresponding to the second message;

receiving, by the first NWDAF, data which is sent by the data provider and matching the first parameter.

2. The data collection method according to claim 1, wherein the executing, by the first NWDAF, the corresponding data collection strategy according to the inquiry result comprises:

sending, by the first NWDAF, a third message to a second NWDAF which is collecting data matching the first parameter in case that the first NWDAF discovers, through the first network device, the second NWDAF, the third message is provided for requesting or subscribing data matching the first parameter, wherein the third message comprises at least the first parameter;

receiving, by the first NWDAF, a success response message which is sent by the second NWDAF and corresponding to the third message;

receiving, by the first NWDAF, data which is sent by the second NWDAF and matching the first parameter.

3. The data collection method according to claim 1, wherein the executing, by the first NWDAF, the corresponding data collection strategy according to the inquiry result comprises:

obtaining, by the first NWDAF through the first network device, information of a target NWDAF in case that the first NWDAF discovers, through the first network device, the existing NWDAF and a second network device which have already stored data matching the first parameter, the target NWDAF being the NWDAF or the second network device, wherein the target NWDAF is determined based on load states of the NWDAF and the second network device;

sending, by the first NWDAF, a fourth message to the target NWDAF, the fourth message is provided for requesting or subscribing data matching the first parameter, wherein the fourth message comprises at least the first parameter;

receiving, by the first NWDAF, a success response message sent by the target NWDAF and corresponding to the fourth message;

judging, by the first NWDAF, whether the data stored by the target NWDAF satisfies the first parameter;

receiving, by the first NWDAF, data sent by the target NWDAF and matching the first parameter in case that the data stored by the target NWDAF satisfies the first parameter.

4. The data collection method according to claim 3, further comprising:

discovering, by the first NWDAF, a data provider through an NRF in case that the data stored by the target NWDAF does not satisfy the first parameter;

sending, by the first NWDAF, a fifth message to the data provider, the fifth message is provided for requesting or subscribing first data which satisfies the first parameter and is not stored by the target NWDAF;

receiving, by the first NWDAF, a success response message sent by the data provider and corresponding to the fifth message;

receiving, by the first NWDAF, the first data sent by the data provider.

5. The data collection method according to claim 1, wherein, prior to the executing, by the first NWDAF, the corresponding data collection strategy according to the inquiry result, the method further comprises:

sending, by the first NWDAF, a sixth message to the first network device, the sixth message is provided for registering or updating a profile of data, wherein the sixth message comprises at least a first profile, the first profile at least comprising at least one of: an NWDAF identifier (ID), the first parameter, or a first data obtaining status.

6. The data collection method according to claim 1, further comprising:

sending, by the first NWDAF, a seventh message to the first network device after the data collection is completed, the seventh message is provided for updating a profile of data, wherein the seventh message comprises a second profile, the second profile at least comprising at least one of: an NWDAF ID, the first parameter, or a second data obtaining status.

7. The data collection method according to claim 1, further comprising:

obtaining and feeding back, by the first NWDAF, a data analysis result to the service consumer;

sending, by the first NWDAF, an eighth message to the first network device, the eighth message is provided for registering or updating an analysis result, wherein the eighth message comprises a third profile, the third profile at least comprising at least one of: NWDAF type information, a user equipment (UE) ID, an analytics ID, a network slice ID, or a serving area.

8. The data collection method according to claim 7, further comprising:

discovering, by the first NWDAF, a second network device through an NRF;

sending, by the first NWDAF, a ninth message to the second network device, the ninth message is provided for requesting data aggregation, and receiving, by the first NWDAF, a success response message sent by the second network device and corresponding to the ninth message;

sending, by the first NWDAF, the data analysis result to the second network device.

9. The data collection method according to claim 1, wherein the first NWDAF is a second network device.

10. A data collection method, comprising:

receiving, by a second network device, a ninth message sent by a first NWDAF, the ninth message is provided for requesting data aggregation, wherein the ninth message comprises at least related information of collected data and analysis report information;

judging, by the second network device based on the related information of data, whether there is matching data being transferred or has been stored, and/or, judging, by the second network device based on the analysis report information, there is matching data analysis result being transferred or has been stored;

discovering a data provider through a network repository function (NRF) in case that the first NWDAF does not discover through the second network device, an existing NWDAF which is collecting or has already stored matching data:

sending, by the second network device, a response message corresponding to the ninth message to the first NWDAF in case that there is matching data being transferred or has been stored, and/or there is matching data analysis result being transferred or has been stored, wherein the response message is provided for informing the first NWDAF that the related information is being transferred or has been stored;

sending, by the second network device, a success response message corresponding to the ninth message to the first NWDAF in case that there is no matching data being transferred or has been stored, and/or, there is no matching data analysis result being transferred or has been stored.

11. The data collection method according to claim 10, further comprising:

sending, by the second network device, a tenth message to the first network device when starting aggregating data and/or data analysis results, the tenth message is provided for registering or updating a profile of data and/or analysis result;

sending, by the second network device, an eleventh message to the first network device when aggregation of data and/or data analysis results is completed, the eleventh message is provided for updating the profile of data and/or analysis result.

12. The data collection method according to claim 11, further comprising:

receiving, by a first network device, a fourteenth message sent by an NWDAF, the fourteenth message is provided for registering or updating a profile of data, wherein the fourteenth message comprises a fourth profile, the fourth profile at least comprising at least one of a first parameter, or a data obtaining status, the first parameter at least comprising at least one of: a data collection time parameter, or area information;

determining, by the first network device based on the data obtaining status, a data collection status of the NWDAF;

the method further comprises:

in case that the first network device determines that an existing NWDAF and a second network device have already stored data matching the first parameter, obtaining, by the first network device through an NRF, load states of the NWDAF and the second network device, and determining, by the first network device based on the load states of the NWDAF and the second network device, a target NWDAF.

13. The data collection method according to claim 12, wherein, in case that the data obtaining status is a first data obtaining status, the data collection status of the NWDAF is a collecting status;

in case that the data obtaining status is a second data obtaining status, the data collection status of the NWDAF is a completed status.

14. A non-transitory computer readable storage medium storing a computer program, wherein, the computer program is configured to be executed by a processor to implement steps of the method according to claim 1.

15. A network device, comprising a memory, a processor and a computer program stored in the memory and executable by the processor, wherein, the processor is configured to execute the computer program to implement steps of the method according to claim 1.

16. A network device, comprising a memory, a processor and a computer program stored in the memory and executable by the processor, wherein, the processor is configured to execute the computer program to implement steps of the method according to claim 10.

17. A network device, comprising a memory, a processor and a computer program stored in the memory and executable by the processor, wherein, the processor is configured to execute the computer program to implement steps of the method according to claim 12.

* * * * *